3,151,244
ACCESSORY-CARRYING MEMBER FOR A
RADIATION-PROTECTIVE SCREEN
Jean Savouyaud, Orsay, and Jean Vertut, Paris, France, assignors to Commissariat a l'Energie Atomique, Paris, France
Filed Dec. 20, 1960, Ser. No. 77,077
Claims priority, application France, Jan. 14, 1960, 815,647
7 Claims. (Cl. 250—108)

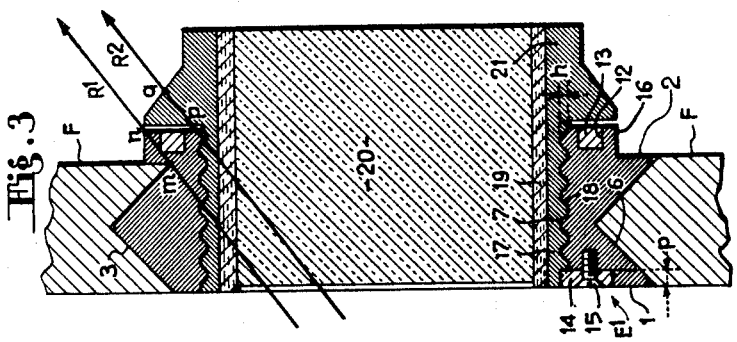
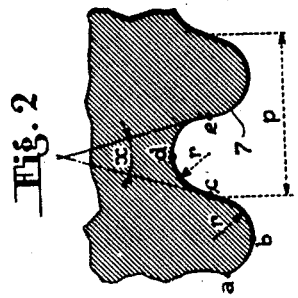
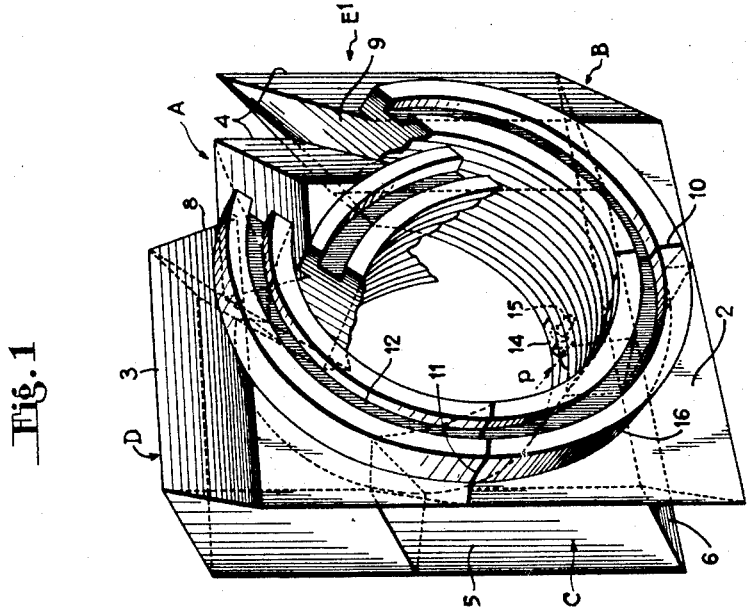

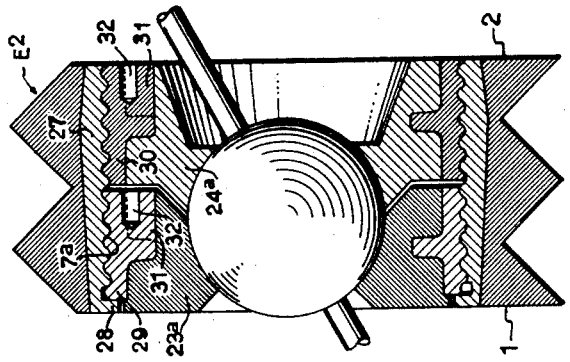
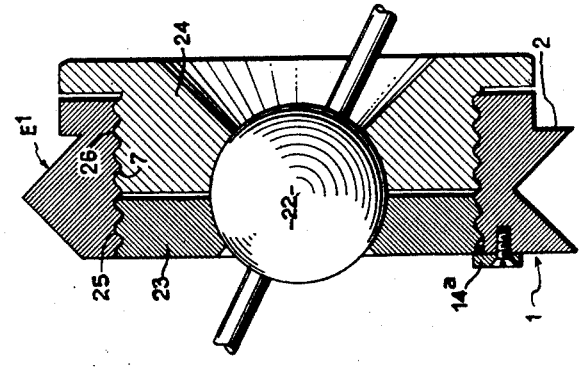

The present invention relates to radiation-protective screens having openings adapted to receive either glasses forming portholes, or articulated joints, gloves or other devices allowing the different operations to be carried out inside an area defined by the screen, by outside observation or manipulation. These glasses or devices should, in order to ease operations, be easily removable and interchangeable without, however, compromising the protection against the issue of radiation past the joint between the device in question and the wall of the opening of the member which carries it when they are put in position.

Up to now these contradictory requirements have only been obtained by sacrificing removability to the hermetic state which is obviously the first consideration.

The invention has as an object to remedy this drawback by providing an accessory-carrying member for such screens, having a circular transverse opening which is helically threaded to receive an accessory screwable thereinto to form a radiation-tight joint.

The invention not only allows a threaded accessory to be screwed into the opening but also gives a complete protection against the possibility of radiation escaping from the junction zone between the member and the accessory by the fact that the surface sections of the opening in a radial axial plane are not straight but are undulated or zig-zag according to the profile of the thread used.

According to an embodiment of the invention, the member comprises a plurality of mutually interfitting sub-members whose mutual joining surfaces have at least two facets in order to prevent the radiations from passing through the joining surfaces of one of these sub-members being parallel to the same radial direction in such a way that the sub-member can be removed and put in place radially through the opening in the member.

Thus it is possible, without in any way sacrificing the necessary protection, to put in place and to dismount the member of an existing screen.

Other characteristics will be seen from the description which will follow.

In order that the invention may be more clearly understood, reference will now be made to the accompanying drawings which show some embodiments thereof by way of example and in which:

FIGURE 1 shows a perspective view of a first embodiment of a composite accessory-carrying member comprising several sub-members one of which is shown in an intermediate position during mounting thereof, FIGURE 2 shows a partial longitudinal section on a larger scale of part of the threaded surface of the member of FIG. 1, FIGURE 3 shows a section through a porthole comprising the member of FIG. 1 and a glass having a threaded mounting screwed into the opening of said member, FIGURES 4 and 5 are analagous sections of two further embodiments including mountings carrying articulated joints intended to receive a tool such as a remote manipulation pincer.

Referring to the drawings, in the embodiment shown in FIGURES 1 to 3, there is shown by the general reference $E_1$, an accessory-carrying member which is made up of four sub-members A, B, C and D, which, when assembled together form a block which may be of lead, cast iron, concrete or other material and which can stop radiations even when of relatively reduced thickness. This block is contained in a parallelepipedic rectangle. Its major surfaces 1 and 2 are plane, and its lateral surfaces, in order to poduce joining sufaces which can stop radiations are prismatic or cylindrical and can have two or more facets or undulations. In the embodiment shown, the major surfaces 1 and 2 are assumed to be square; the lateral surfaces 3 and 4 form a projecting prism; the two other surfaces 5 and 6 form a complementary recessed prism, the edges being preferably slightly rounded or replaced by light plates.

The member $E_1$ comprising the four sub-members A, B, C and D is provided with a large circular and cylindrical opening 7, whose internal surface, divided over the four sub-members, is threaded and preferably, although not exclusively, the thread has a rounded profile as shown, for example, in FIGURE 2, where the thread profile is made up of two portions $abc$ and $cde$ joining oppositely curved arcs which correspond respectively to the tops and bottoms of the threads.

By way of non-limiting example, for a thread of a pitch $p$ equal to 6 millimetres, the radius of curvature $r$ can advantageously be of the order of 15 millimetres, the tangents at $c$ and $e$ in the middle of the sides of the teeth being either parallel or converging towards the circumference of the member, the angle $x$ being of the order of 30°.

Such a thread is particularly advantageous, because on the one hand it is not easily breakable and therefore there is little risk of its being damaged during different manipulations, mountings and dismountings, and, on the other hand, as is generally known, it is relatively easer to manufacture by machining or particularly by casting than threads having a conventional profile, with threads of a more or less triangular section. It is in fact less fragile while being machined or cast, the relative recession of the member with regard to the threaded core on which it has been cast being less difficult to unscrew than in the case of a conventional thread profile.

The four sub-members A, B, C and D are in mutual contact by four joining surfaces 8, 9, 10, 11 (FIGURE 1) which have the same profile as the lateral surfaces of the block itself, in such a way that any local play between the sub-members cannot allow the passage of dangerous radiation.

Apart from this the surfaces 8 and 9 are parallel to the same radial direction, so that the sub-member A can be the last to be put in place or the first to be removed from the central opening 7 and this allows the positioning and dismounting of the member into and out of an existing screen by the successive positioning and removal of each of the sub-members.

The sub-members preferably have in one of the major surfaces of the member, for example in the surface 2, the arcuate parts of a circular groove 12 which is intended to receive a ring 13 which retains the sub-members in interfitting relationship, particularly when the accessory for which the member is intended is not in place.

The composite member $E_1$ is completed by a stop 14 embedded in its surface 1 facing towards the radiation. This stop, fixed, for example, by screws 15, projects into the opening 7 to an extent at least equal to the pitch $p$ of the thread and to a radial depth at least equal to the depth $h$ of the thread (FIGURE 3).

It will be noted that the member $E_1$ can advantageously have an extra thickness 16 (FIGURES 1 and 3) of circular shape, for instance, with regard to the adjacent members F of the structure of which it should form an integral part: this extra thickness, where present, is located preferably on the surface 2 so that it is not exposed to radiation.

The described member $E_1$ can receive and carry any accessory.

In the embodiment, in FIGURE 3, the member forms a porthole in combination with a metal mounting 17, e.g. of cast iron, which is threaded on its outside at 18, the thread having the same pitch and profile as the thread 7 and in which there is sealed, with the aid of a strongly adhesive cement 19 having a coefficient of expansion at least equal to that of glass, a thick glass 20 of any known composition which is rich in lead.

The mounting 17 has a flange 21, which is intended to be located either in the immediate vicinity of the extra thickness 16 of the member $E_1$ if the stop 14 is used, this stop limiting the forward travel of the mounting 17 by abutting the end of the thread of the mounting 17, or into direct contact if the stop 14 is not used.

It is seen that due to the extra thickness 16 and the flange 21, the lengths, in a protective material, of rays such as $R_1$ or $R_2$ are increased by the lengths *mn* and *pq*.

In FIGURE 4, the member $E_1$ in which the stop 14a projects beyond the surface 1, serves to locate an articulated manipulation joint 22, which is positioned between two mountings 23 and 24, of lead or similar material, directly screwed by their threads 25 and 26 into the threaded opening 7 of the member $E_1$.

FIGURE 5 shows a modification of the accessory-carrying member at $E_2$ which also may be made from lead, concrete or other material, and in which is embedded a ring 27 of cast iron or similar material comprising the threaded opening 7a and terminating on the side of the surface 1, which is exposed to radiation, in a non-threaded stop flange 28.

The lead mountings 23a and 24a are respectively encompassed by threaded ring 29, 30 of bronze or cast iron, for example, having internal lugs 31, provided with holes 32, intended to receive the pins of a spanner.

The invention is, of course, in no way limited to the embodiments shown and described which have only been chosen by way of example. If desired the member according to the invention can be in one part.

We claim:
1. In an accessory-carrying member for a radiation-protective screen, a circular transverse opening in said member, helical threads in said opening and an accessory of radiation shielding material mounted in said threads to form a radiation-tight joint, said member comprising a plurality of mutually interfitting segmental sub-members radially disposed about the periphery of said opening, mutual joining surfaces for said sub-members and at least two planar facets for each of said surfaces disposed at an angle to each other preventing the passage of radiation, said planar facets for said joining surfaces of one of said submembers being parallel to radii of said opening whereby said one sub-member may be mounted and dismounted radially through said opening.

2. A member as described in claim 1 including a major surface for each of said sub-members, an arcuate groove in each major surface forming a complete circular groove when said sub-members are in assembled position and a ring mounted in said circular groove retaining said sub-members in assembled position.

3. In a member as described in claim 1, the section of each portion of said threads being formed of two arcs having tangents converging in said member and intersecting at an angle of about 30°.

4. In a member as described in claim 1, said threads being formed directly in said member.

5. A member as described in claim 1 including an intermediate member, said threads being formed in said intermediate member, said intermediate member being a ring of cast iron embedded in said member and said member being of radiation-protective material.

6. A member as described in claim 1 including a stop secured to said member facing towards the source of radiation and projecting over an end of said threads limiting the forward movement of said accessory when rotated in said threads.

7. A member as described in claim 1, including lateral surfaces for said accessory having a herring-bone transverse section.

References Cited in the file of this patent
UNITED STATES PATENTS

| | | |
|---|---|---|
| 2,556,546 | Lee | June 12, 1951 |
| 2,957,210 | Levenson | Oct. 25, 1960 |
| 2,968,734 | Yeomans | Jan. 17, 1961 |
| 2,997,592 | Costello | Aug. 22, 1961 |

FOREIGN PATENTS

| | | |
|---|---|---|
| 764,575 | Great Britain | Dec. 28, 1956 |
| 844,346 | Great Britain | Aug. 10, 1960 |